(12) United States Patent
Eleftheriou et al.

(10) Patent No.: US 7,876,662 B2
(45) Date of Patent: Jan. 25, 2011

(54) RECORDING IN PROBE-BASED DATA STORAGE DEVICES

(75) Inventors: Evangelos S. Eleftheriou, Zurich (CH); Charalampos Pozidis, Thalwil (CH)

(73) Assignee: International Business Machines Corporation, Armonk, NY (US)

( * ) Notice: Subject to any disclaimer, the term of this patent is extended or adjusted under 35 U.S.C. 154(b) by 489 days.

(21) Appl. No.: 11/944,487

(22) Filed: Nov. 23, 2007

(65) Prior Publication Data

US 2008/0144477 A1    Jun. 19, 2008

(30) Foreign Application Priority Data

Nov. 23, 2006    (EP)    ................................. 06124665

(51) Int. Cl.
*G11B 7/00* (2006.01)
(52) U.S. Cl. ...................................... 369/126
(58) Field of Classification Search ................ None
See application file for complete search history.

(56) References Cited

U.S. PATENT DOCUMENTS 7,218,600 B2 * 5/2007 Cho et al. .................. 369/126

2004/0114490 A1 * 6/2004 Antonakopoulos et al. .. 369/101
2009/0003187 A1 * 1/2009 Cherubini et al. ........... 369/126

* cited by examiner

*Primary Examiner*—Joseph Haley
(74) *Attorney, Agent, or Firm*—Kenneth R. Corsello; William Stock; Anne Vachon Dougherty

(57) ABSTRACT

Methods and apparatus are provided for recording/reproduction of data in a probe-based data storage device (1) in which application of a write signal causes formation of an indentation in a storage surface (5) by a probe of the device (1). Instead of storing information in the presence or absence of indentations on the storage surface as is conventionally done in such devices, information is stored in the form of grooves of variable length separated by lands of variable length. More particularly, a sequence of n>1 successive bits of a first value (typically "1's") in a recording signal is recorded by applying a series of write signals at respective probe-positions on the storage surface (5). These probe-positions are spaced at $w \leq M$, where M is the indentation merging distance, so that the resulting indentations merge to form a groove in the storage surface (5) spanning n readback sample positions. The readback signal corresponding to the recording signal is sampled at timings corresponding to the readback sample positions to recover the original bit sequence. High density recording is provided because the readback sample position spacing s here satisfies s<D, where D is the indentation interference threshold.

20 Claims, 5 Drawing Sheets

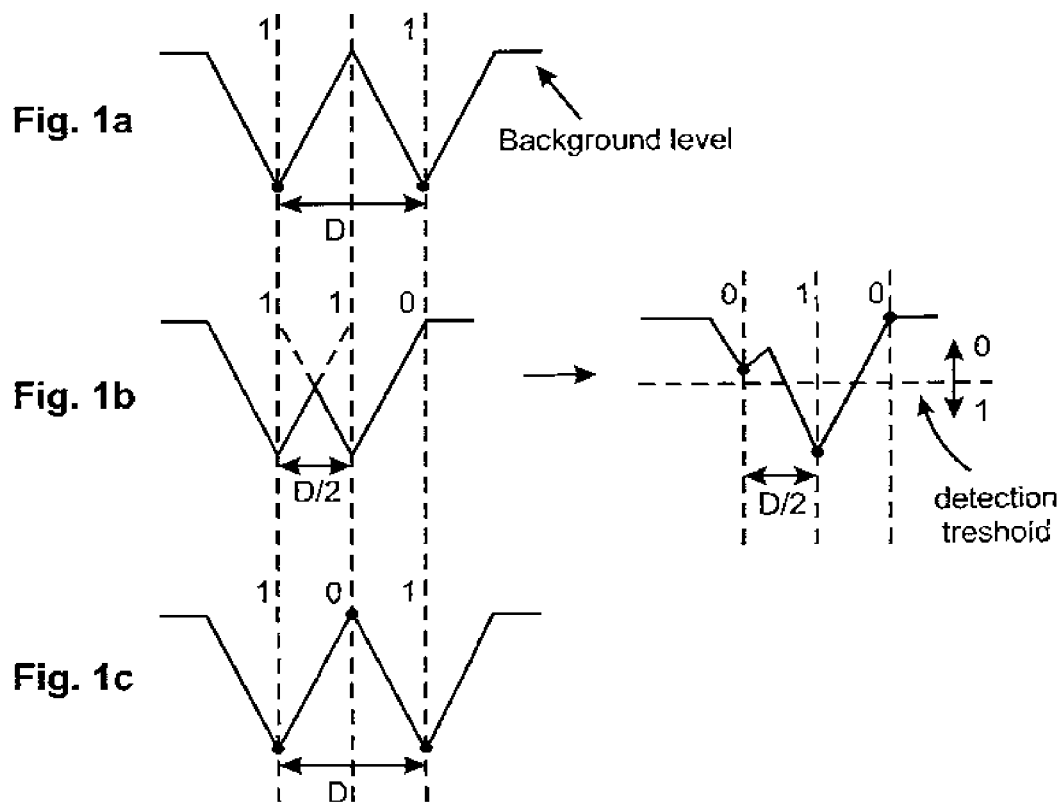
Fig. 1a
Fig. 1b
Fig. 1c
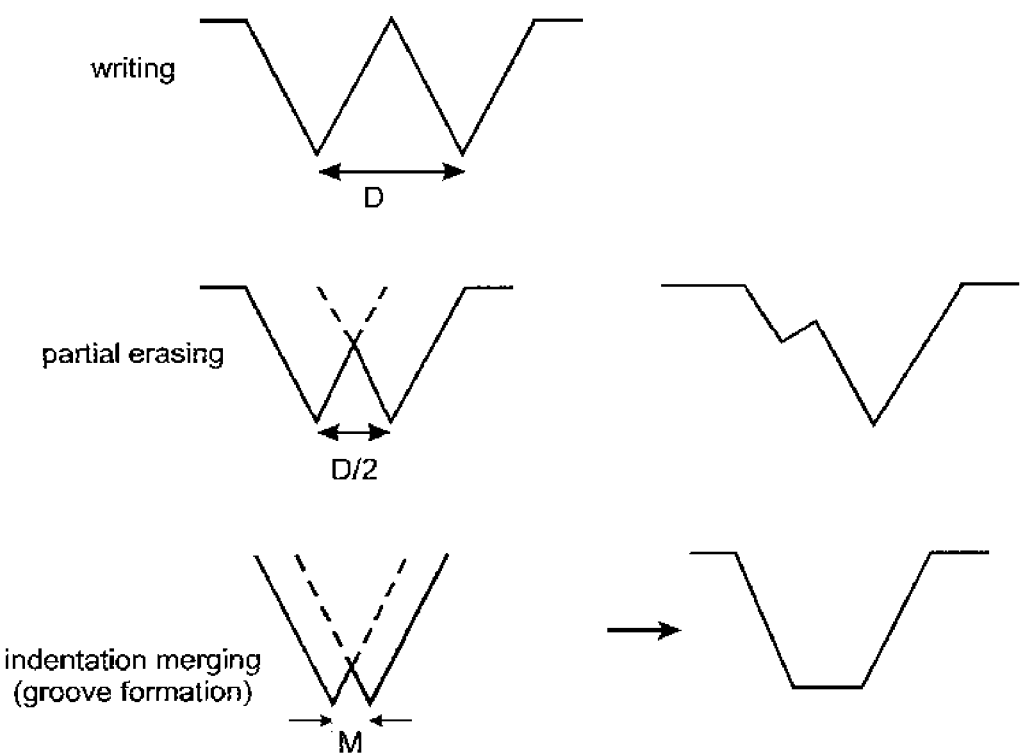
Fig. 2

RECORDING IN PROBE-BASED DATA STORAGE DEVICES

The present invention relates generally to probe-based data storage devices. Methods, apparatus and computer programs are provided for implementing recording/reproduction techniques offering higher storage densities in these devices.

BACKGROUND OF THE INVENTION

In some probe-based data storage devices, the carrier of information is the presence or absence of topographical indentations, or "pits", on a storage surface. Typically the presence of an indentation corresponds to a bit of value "1" while the absence of an indentation corresponds to a bit of value "0". Each indentation is formed by application of a write signal which causes a probe of the device to deform the storage surface to create the indentation. For example, in AFM (Atomic Force Microscope)-based storage devices, the probe is a nanometer-sharp tip mounted on the end of a microfabricated cantilever. This tip can be moved over the surface of a storage medium in the form of a polymer film. A single indentation is formed by simultaneously applying a voltage pulse across certain terminals of the AFM cantilever and another voltage pulse between a substrate underneath the polymer film and a platform on the body of the cantilever. The first pulse heats a resistive element that heats the cantilever tip, while the second pulse creates an electrostatic force between the cantilever and substrate which forces the tip into the polymer film. These two pulses collectively form the write signal here, a single write signal being applied at each probe position on the storage surface where an indentation is to be created. In a read mode, the thermomechanical probe mechanism can be used to readback stored bits by detecting the deflection of the cantilever as the tip is moved over the pattern of bit indentations. AFM-based data storage is described in detail in IBM Journal of Research & Development, Volume 44, No. 3, May 2000, pp 323-340, "The 'Millipede'—More Than One Thousand Tips for Future AFM Data Storage", Vettiger et al., and the references cited therein. As described in this document, while basic read/write operations can be implemented using a single cantilever probe, in practice an integrated array of individually-addressable cantilevers is employed in order to facilitate increased data rates. Each cantilever of the array can read and write data within its own storage field as the array is moved relative to the surface of the storage medium.

For increased storage area density in probe-based devices, the indentations should preferably be placed close to each other. However, when the distance between indentations drops below a certain threshold, the indentations start to interact in a non-linear way. In particular, each newly created indentation partially "erases" previously-formed indentations spaced at a distance smaller than the threshold distance. The threshold distance, denoted by D and hereinafter also referred to as the indentation interference threshold, is dependent on the shape of the tip which penetrates the polymer film. The sharper the tip, the smaller D is. When the partially-erased indentations are read back, they correspond to a reduced signal amplitude compared to indentations which are not partially erased. These principles are illustrated in FIGS. 1a and 1b of the accompanying drawings. FIG. 1a shows two indentations written at the threshold distance D, where no interference occurs between indentations. FIG. 1b illustrates the partial erasing occurring when the spacing between indentations is reduced below the indentation interference threshold D, here to D/2. The later-formed indentation partially erases the former, resulting in the topography shown on the right-hand side of this figure. Vertical dotted lines indicate the timings at which the analog readback waveform corresponding to the written topography is sampled in each case, with the dots representing the corresponding sample values. In the FIG. 1a scenario, the correct readback sample values (1 1) are obtained. In FIG. 1b, however, the readback signal amplitude corresponding to the partially erased indentation has an intermediate level which is close to the detection threshold. In the presence of noise or other forms of distortion this sample value may easily shift above the threshold and be erroneously detected as "0". This is illustrated in the figure where the written symbol values are 1 1 0 but the partial erasing results in readback sample values of 0 1 0. Thus, the noise margin of partially-erased indentations is reduced compared to non-erased indentations, leading to detection errors and hence loss of performance. It is therefore desirable to avoid partial erasing as far as possible.

One way to facilitate increased storage density and yet inhibit partial erasing is to resort to sharper tips. The sharpness of the tip determines the plastic radius surrounding each indentation, this being smaller for sharper tips. The plastic radius in turn determines how closely two indentations can approach each other before partial erasing occurs, i.e. D. Hence sharper tips lead to smaller indentation interference thresholds D. The problem with increasingly sharp tips, however, is that they are increasingly hard to fabricate. In particular, for large arrays of tips, tip homogeneity may be difficult for sharp tips compared to blunt tips. In addition, even if the above problems could be solved, sharp tips would not retain their sharpness for long, since tip wear due to rubbing of the tip against the storage medium would blunt the tip.

Another way to facilitate increased storage density while avoiding partial erasing is to use coding on the stored data. One family of codes that are used are the so-called (d, k) codes which ensure that consecutive "1's" in the coded bit sequence are separated by at least d, and at most k, "0's", where the number $d \geq 1$. Since the physical distance between consecutive "1's", or indentations, is limited to D, by artificially inserting d "0's" between the "1's" we can effectively decrease the symbol distance, that is, the distance between bits of the coded sequence, to D/(d+1) from the uncoded distance of D between information bits. FIG. 1c illustrates this concept for the case of d=1. Here, the distance between two consecutive "1's" is kept at the threshold distance D, but one coded bit of value "0" is introduced between them. In effect, therefore, the distance between code symbols is reduced to D/2, but there is no interference between indentations because the minimum distance between them is always D. A drawback of (d, k) codes is that not all possible sequences of "1's and "0's" are allowed in the coded bitstream. In the case of d=1 codes, for example, the sequence 1 1 is not allowed. Consequently, there is an inherent rate loss associated with the coding process. This is quantified as the code rate R, a number less than one, which increases the effective symbol distance by 1/R. There is therefore an overall gain in storage density by a factor of R*(d+1) compared to the uncoded case. In the thermomechanical probe-storage system described above, for example, a (d=1, k=7) code has been chosen with a code rate R=2/3, offering a density increase of (2/3)*(2)=4/3. However, because of the code rate R<1, for a data rate r that the user sees, the electronics in the device has to process data at an internal rate of (r/R)>r. Thus, for a fixed IC technology, the user data rate of a coded system will be lower than that of an uncoded system. Coding of this form therefore trades storage density for user data rate.

Accordingly, it is desirable to provide a system for increasing storage density in probe-based data storage devices which can alleviate the drawbacks of existing systems discussed above.

SUMMARY OF THE INVENTION

An embodiment of a first aspect of the present invention provides a method for recording/reproduction of data in a probe-based data storage device in which application of a write signal causes formation of an indentation in a storage surface by a probe of the device. The method comprises:

recording a sequence of $n>1$ successive bits of a first value in a recording signal by applying a series of write signals at respective probe-positions on the storage surface spaced at $w \leq M$, where M is the indentation merging distance, to form a groove in the storage surface spanning n readback sample positions; and sampling a readback signal corresponding to the recording signal at timings corresponding to the readback sample positions, wherein the readback sample position spacing $s<D$, where D is the indentation interference threshold.

The present invention exploits a phenomenon that occurs when the spacing between indentations on the storage surface is reduced further than that at which partial erasing occurs. In particular, when the inter-indentation spacing is reduced to a threshold distance we denote by M, then the indentations merge into one larger indentation of bigger diameter and depth than an isolated indentation, i.e. a single "pit" in previously-proposed systems. By creating several closely-spaced indentations in this manner along the write-direction on the storage surface, a continuous groove of approximately uniform depth can be formed. A new system for storing data in probe-based devices is therefore proposed, where bit-patterns in the recording signal are stored in the form of grooves of varying length separated by lands of varying length. In particular, a run of more than one successive bits of a first value, typically bits of value "1", is stored by applying a series of write signals, to form a series of indentations, at a series of probe-positions on the storage surface spaced at $w \leq M$, where M is the indentation-merging distance just described. These indentations therefore merge to form a groove whose length depends on the number of write signals applied as the probe is moved along the write-direction. This depends on the number of bits in the aforementioned run to be recorded. A run of $n>1$ successive bits of the first value will be recorded by applying write signals to form a groove which spans n readback sample positions. When the readback signal is then sampled at timings corresponding to these readback sample positions, the run of n bits will be successfully recovered. The particular elegance of this new recording system lies in the fact that, by using grooves to represent the n-bit runs, the problem of partial erasing is obviated, so that the readback sample position spacing s can be reduced below the threshold distance D. Embodiments of the invention thus offer increased storage density while maintaining detection performance by avoiding partial erasing. In addition, the increased storage density is not coupled with the use of sharper tips, thus reducing the effects of factors such as tip blunting, aging, and non-uniformity, for example, on the storage density. Moreover, the increased density may be achieved without affecting the user data rate, since there is no need for coding of the input signal as required in systems discussed above.

In general, either of the two possible binary values in the recording signal may be represented by indentations in the storage surface, bits of the other value being represented by no indentation, i.e. a land. In other words, bits of the aforementioned first value may be either "1's or "0's". However, it is typical in probe-based recording for "1's to be represented by indentations, and thus bits of said first value will typically be bits of value "1". This convention will be assumed for simplicity in the following, on the understanding that embodiments of the invention may equally employ the opposite system, where said first value is "0".

While runs of $n>1$ "1's" in the recording signal are written as grooves in the storage surface by applying a series of write signals, an isolated "1" is preferably written by applying a single write signal. Thus an isolated "1" is represented by a single indentation, or pit, as in previously-proposed systems. The grooves formed in the storage surface to implement the "grooves-and-lands" system of recording may thus be of varying lengths, from that of a single pit upwards.

The particular value of the readback sample position spacing s may vary in embodiments of the invention, but is preferably in the range $D/2 \leq s < D$. Most preferably, $s=D/2$, giving increased storage density while avoiding the need for input coding and still avoiding partial erasing.

When recording a run of successive "1's", the "write-signal spacing", i.e. the spacing w between probe-positions at which write-signals are applied, is preferably equal to the indentation merging distance M. This allows formation of grooves with reduced number of write signals.

While coding of the input signal is not done for operation of an embodiment of the present invention, it may be desirable in certain circumstances to apply some form of input coding. A particular example of this is where it is desired to record directly over old, previously-written data without first erasing the old data. The difficulties presented by such a "direct-overwrite" requirement, and how direct overwriting can be achieved in embodiments of the invention, will be described in detail below.

In an embodiment of a second aspect of the present invention, there is provided a computer program comprising instructions for controlling a probe-based data storage device to perform a data recording/reproduction method according to an embodiment of the first aspect of the invention. Such a computer program may be implemented by any component of a probe-based data storage system which has a data processing capability for implementing a computer program. Moreover, a computer program embodying the invention may constitute an independent program or may be an element of a larger program, and may be supplied, for example, embodied in a computer-readable medium such as a disk or an electronic transmission for loading in a computer. The instructions of the computer program may comprise program code, the program code comprising any expression, in any language, code or notation, of a set of instructions intended to cause performance of the method in question, either directly or after either or both of (a) conversion to another language, code or notation, and (b) reproduction in a different material form.

An embodiment of a third aspect of the present invention provides apparatus for controlling recording/reproduction of data in a probe-based data storage device in which application of a write signal causes formation of an indentation in a storage surface by a probe of the device. The apparatus is adapted to:

effect recording of a sequence of $n>1$ successive bits of a first value in a recording signal by application of a series of write signals at respective probe-positions on the storage surface spaced at $w \leq M$, where M is the indentation merging distance, to form a groove in the storage surface spanning n readback sample positions; and control sampling of a readback signal corresponding to the recording signal at timings corresponding to the readback sample positions, wherein the readback sample position spacing s<D, where D is the indentation interference threshold.

An embodiment of a fourth aspect of the present invention provides a probe-based data storage device comprising:

a storage surface;

a read/write mechanism comprising at least one probe movable relative to the storage surface for writing to, and reading from, the surface, wherein application of a write signal causes formation of an indentation in the storage surface by the probe;

a controller for controlling the read/write mechanism to effect recording of a sequence of n>1 successive bits of a first value in a recording signal by application of a series of write signals at respective probe-positions on the storage surface spaced at w≦M, where M is the indentation merging distance, to form a groove in the storage surface spanning n readback sample positions; and a sampler for sampling a readback signal corresponding to the recording signal at timings corresponding to the readback sample positions, wherein the readback sample position spacing s<D, where D is the indentation interference threshold.

In general, where features are described herein with reference to an embodiment of one aspect of the invention, corresponding features may be provided in embodiments of another aspect of the invention.

BRIEF DESCRIPTION OF THE DRAWINGS

Preferred embodiments of the invention will now be described, by way of example, with reference to the accompanying drawings in which:

FIGS. 1a, 1b and 1c (as described above) illustrate different recording/reproduction scenarios in existing probe-based recording systems;

FIG. 2 illustrates the principle behind operation of embodiments of the invention in comparison to known systems;

DETAILED DESCRIPTION OF THE INVENTION

Before describing operation of an embodiment of the present invention, the principle exploited therein will be explained with reference to FIG. 2. An embodiment of the present invention takes advantage of the fact that thermomechanically-written topographic indentations in polymer films merge into continuous grooves when they are closely spaced spatially. Three different regimes of topographic modification may be distinguished when the spatial distance between the indentations is reduced. In the first regime, where the distance between indentations is at least equal to the indentation interference threshold D, no interference between indentations occurs. This is illustrated in the top diagram in FIG. 2 for an indentation spacing of D. This is the regime in which data writing is typically performed as described earlier with reference to FIGS. 1a and 1c. As already explained, the extent to which the storage density may be increased depends on the threshold D. As soon as the spacing between indentations is reduced below the threshold D, interference between indentations occurs. In particular, each newly created indentation partially fills up, or "erases", any neighboring indentations which are spaced within a distance D of the new indentation. This is the second regime of topographic change as described with reference to FIG. 1b, and is illustrated in the middle diagram of FIG. 2. When the spacing between indentations is reduced further, and specifically reaches a threshold distance M, then the indentations merge into one larger indentation, with bigger diameter and depth than an isolated indentation. This is illustrated in the bottom diagram of FIG. 2. By creating a series of indentations at a spacing of M or less along the write-track direction on the storage surface, a continuous groove of approximately uniform depth can be formed. It is this principle which is exploited in the embodiment to be described. More particularly, instead of storing information in the presence or absence of indentations as is typically done, information is stored in the form of grooves of variable length separated by lands of variable length. Grooves are trenches of a certain depth, while the lands have substantially the same topological profile as the recording medium background. In the example described, grooves are taken to correspond to logical "1's" while lands correspond to logical "0's".

Figure 3:
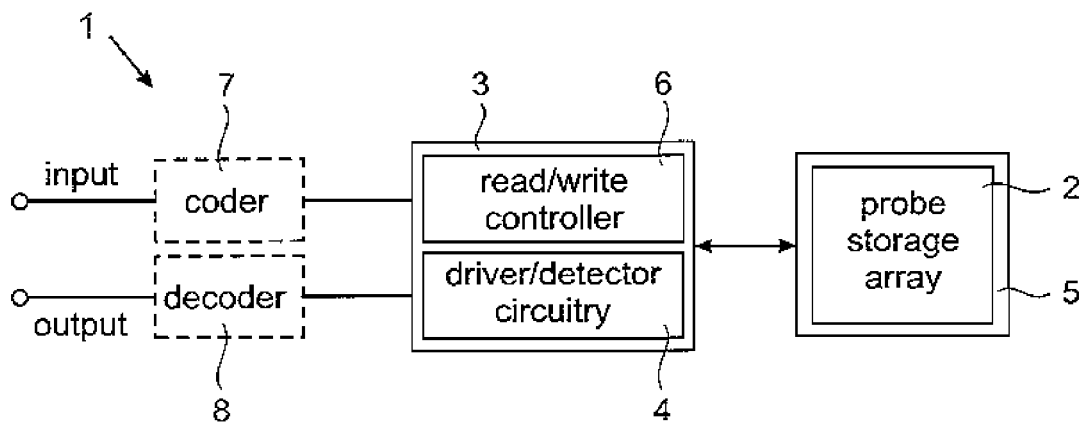
FIG. 3 is a schematic representation of a probe-based data storage device embodying the invention.

FIG. 3 is a schematic illustration of a probe-based storage device 1 embodying the invention. The device 1 includes a read/write mechanism which in this embodiment comprises a probe-storage array 2 of the type described in the journal reference above. An array controller 3 controls operation of the probe array 2. Array controller 3 includes array driver & detector circuitry 4 as described in the aforementioned reference to drive the individual probes of the array to read and write data on the surface of a polymer storage medium 5. Array controller 3 also includes a read/write controller 6 for controlling operation of array 2 via driver/detector circuitry 4 so as to effect recording/reproduction of data in accordance with the method described below. In general, read/write controller 6 may be implemented in hardware or software or a combination thereof, and suitable implementations will be apparent to those skilled in the art from the description herein. The components 7 and 8 shown in broken lines in the figure are employed in a modified version of the device, described later.

In operation, input data is supplied to array controller 3 for recording. Read/write controller 6 controls the application of write pulses, via driver/detector circuitry 4, to individual probes of the array as the probe array is moved relative to the surface of the polymer storage medium 5. While in practice the individual probes can write data in parallel to their respective storage fields of the array, it suffices for understanding the recording/reproduction technique employed here to consider read/write operations of a single probe. Thus, read/write controller 6 controls the application of write pulses to the probe in accordance with the bit values in the signal to be recorded by that probe. Controller 6 can subsequently control driver/detector circuitry 4 to readback the recorded signal as the probe is moved over the appropriate region of the surface of the polymer storage medium 5. The readback signal is sampled by a sampler (not shown separately) of circuitry 4 at timings corresponding to probe-positions on the storage surface spaced at a distance s. The resulting readback sample values correspond to the bit values of the original recording signal.

The application of write pulses in a recording operation is controlled by read/write controller 6 in accordance with the following system. In this description, a single write pulse is taken to be the signal applied to cause creation of a single indentation by the probe. As mentioned earlier, this signal typically comprises a pair of pulses applied simultaneously to different terminals of the probe. For any sequence of n>1 successive "1's" in the recording signal, a series of write signals are applied at respective probe-positions on the surface of the polymer storage medium 5 spaced at a write-spacing w, where w is set at the indentation merging threshold M described above. The resulting series of indentations therefore merge to form a groove along the on-track direction on storage surface 5. The length of this groove depends on the number of write signals applied which depends on the value of n. Specifically, write signals are applied to form a groove which spans n readback sample positions, also referred to as "symbol positions". When the readback signal is subsequently sampled at timings corresponding to these symbol positions, the original sequence of n successive "1's" will thus be recovered. For isolated "1's" in the recording signal, i.e. those neighbored by "0's" on both sides, a single write pulse is applied at the corresponding readback sample position. To record a "0", no write pulse need be applied since "0's" are represented by the absence of an indentation at a readback sample position.

The indentation merging distance M is typically about D/4 in systems of the type described, and the present example assumes that M=D/4, so that the indentation write-spacing w is set to D/4. The readback sample position spacing, or "symbol spacing", s is set to D/2 units. Continuous grooves of any length which is an integer multiple of D/2 can be formed by applying write pulses at a write-spacing of D/4. Thus, grooves which span any integer number of symbol positions can be produced by an embodiment of the present invention. To form a groove that is one symbol long, i.e. a single pit, one write pulse is used. For a groove that is two symbols long three write pulses are applied. In general in this particular example, an m-symbol-long groove can be formed by applying (2m−1) write pulses at D/4 spacing. The formation of a two-symbol-long groove is illustrated in the bottom diagram of FIG. 4, the left-hand side of which shows writing of the symbol sequence 1 1 0. Three write pulses applied at a write-spacing of D/4 correspond to three indentations which merge to form a continuous groove which spans 2 symbol positions at the symbol spacing D/2. This is illustrated on the right-hand side of the diagram. As shown here, when the readback signal is sampled at timings corresponding to the three symbol positions, the groove appears to have a length of two symbols, and the correct readback sample values 1 1 0 are obtained. In principle, as shown in the figure, the signal samples in the groove have equal amplitude, and the amplitude difference with samples from lands is comparably large and uniform, giving enough noise margin at the detector input. A binary threshold detector can thus be applied for detection of signals recorded as variable-length grooves and lands in accordance with this system.

Figure 4:
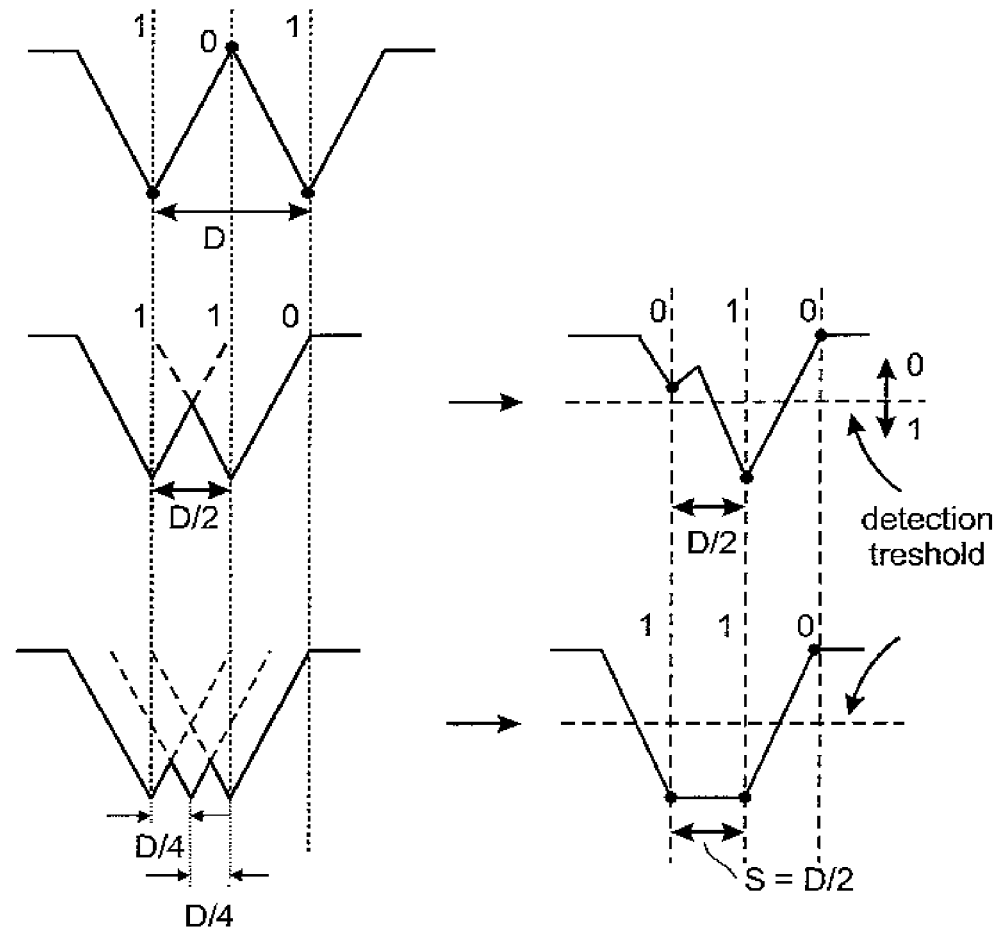
FIG. 4 illustrates the recording/reproduction technique employed in the FIG. 3 embodiment in comparison to known systems.

For the sake of comparison, the top diagram in FIG. 4 shows recording of the sequence 1 0 1 with a known d=1 coding method, corresponding to the minimum possible spacing between "1's" in this code. The middle diagram shows recording of an uncoded sequence 1 1 0 using a symbol spacing of D/2. The middle diagram illustrates the partial erasing problem already described, whereby increasing storage density is only obtained by sacrificing detection performance. In the coding system of the top diagram, the coding process must artificially insert a "0" between any two "1's" to maintain the minimum inter-indentation separation D, resulting in only a partial increase in storage density at the expense of rate loss. The recording/reproduction technique of the present embodiment provides increased storage density without the drawbacks of the previously-proposed systems. Higher recording densities can be achieved while still maintaining detection performance by avoiding partial erasing. The increased storage density is obtained without the use of sharper tips, thus reducing the effects of factors that affect storage density such as, for example, tip blunting/aging/non-uniformity. Increased storage density can be traded for reduced dependency on tip shape variations. In this regard, for example, the embodiment described above is comparable to the d=1 coding system, but may be enhanced at the cost of lowering the density. In effect, a density advantage of less then 50% could be expected for reducing dependency on tip aging effects. Moreover, in embodiments like that just described where no coding of the input signal is employed, there is no rate loss and hence no effect on the user data rate. Since uncoded data is written and reproduced with a symbol spacing of D/2, the density gain achieved is 1*2=2 which is 50% higher than in the d=1 coded case and 100% better than in the regular uncoded case with a bit spacing of D. Although the formation of grooves by writing at a spacing of D/4 means that, on average, more "1's" have to be written than with the d=1 coding method, thus with increased power consumption, this is very much a secondary factor in all but the most power conscious applications envisaged for probe storage arrays. Overall, therefore, an embodiment of the present invention enables higher density recording in probe-storage devices than previously-proposed systems.

While the recording scheme described above imposes no coding requirement on the input user data, it may be desirable to apply some form of coding in certain cases. A particular example of where coding is advantageous is where it is desirable to provide a direct-overwrite capability. Overwriting of data in probe-based data storage devices is problematical. For example, if a zero corresponds to "no indentation" at a bit position, writing a zero at a bit position corresponds to no action. Hence, "writing" a zero over a previously-written "1" at a bit position will leave the old "1" in tact, rendering the newly-written data incorrect. As a further example, writing a "1" at a given probe-position can change neighboring, previously-written 1's to 0's due to partial erasing as described above. Because of these effects, previously-proposed systems have either required old data to be erased before new data can be written, or coding algorithms which take account of the physical interactions between old and new data have been employed for coding the input data. Examples of such algorithms are disclosed in US patent applications published as US 2004/0114490A1 and US 2004/0233817A1. Recording/reproduction techniques embodying the present invention can provide the additional advantage of a direct-overwrite capability by application of a mild form of input coding. This coding imposes a simple constraint on the length of lands. Specifically, the lands are not allowed to be longer than the indentation interference threshold D, or twice the symbol spacing s in the particular example above. Thus, the intended symbol pattern is stored on the storage medium irrespective of the symbol pattern previously stored in the same area. The reason why this is so will now be explained with reference to FIGS. 5*a* and 5*b*.

Figure 5A:
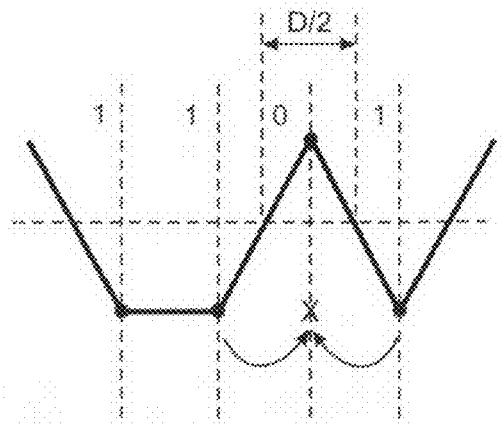
FIGS. 5a and 5b illustrate the reason for a constraint imposed in a modification of the FIG. 3 embodiment which provides a direct-overwrite capability.
Figure 5B:
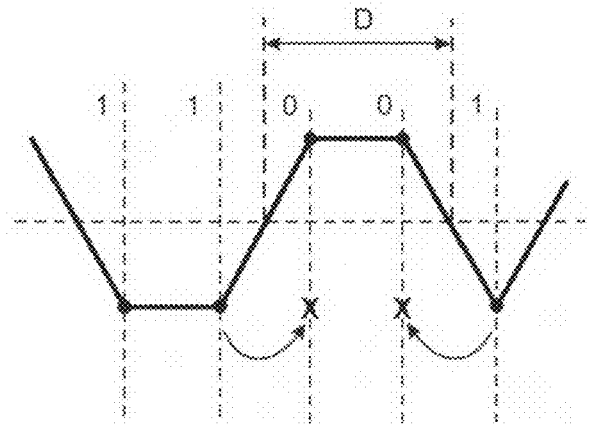

FIG. 5*a* illustrates an example of a pattern in the signal recorded by the FIG. 3 embodiment which produces a land comprising a single "0". The particular pattern shown here is 1101. Suppose that a "1" had previously been recorded at the position of the isolated "0" as indicated by the cross in the figure. As the new pattern is written, formation of the neighboring grooves to the left and right of this position will relax the pre-stored elastic strain in the intended position of the new land as indicated by the arrows in the figure. Thus, a land consisting of a single "0", i.e. of length D/2 here, can always be stored regardless of the groove/land pattern that was previously stored in that area. FIG. 5b illustrates the corresponding scenario for a land of length D, corresponding to two successive "0's" in the present example, with a recording pattern of 11001 here. Formation of the groove on the left will fill up any existing groove within a distance D/2 to its right, i.e. at the position of the first "0" in the recording pattern, as indicated in the figure. Similarly, formation of the groove on the right will fill up any existing groove within a distance D/2 to its left, i.e. at the position of the second "0" in the recording pattern as indicated. The combined action of the surrounding grooves thus ensures that a new land two symbols in length will be formed. Note that lands of three or more symbols in length cannot be guaranteed, unless of course the symbol spacing s is reduced below D/2. In general, however, lands of length greater than D should be avoided in the recording system if a direct-overwrite facility to be facilitated.

To guarantee direct overwriting, the necessary coding can be applied in the FIG. 3 embodiment by incorporating the coder 7, and corresponding decoder 8, shown in broken lines in the figure. The coding applied to the input signal by coder 7 differs from the (1, 7) code currently used in probe-based recording systems in that the maximum number of successive "0's" in the recording signal is constrained to two, while sequences of "1's" can theoretically be unconstrained. However, in order to enhance performance of the timing recovery loop in the detector, an upper bound on the number of consecutive "1's", similar to the k-constraint in (d, k) codes, is also enforced in this case, say k=7. Codes satisfying the above two constraints are entirely analogous to the so-called MTR(j, k) codes used in magnetic recording, with the "0's" and "1's" interchanged. In the present recording scheme, j=2 and k=7. A practical MTR (2, 7) code, with a rate R=6/7, which can be used in coder 7, the inverse of this coding scheme being implemented in decoder 8, is described in "Maximum Transition Run Codes for Generalized Partial Response Channels", Cideciyan et al., IEEE Journal on Sel. Areas in Communications, vol. 19, no. 4, pp 619-634, April 2001, the relevant content of which is incorporated herein by reference. This is a simpler code implementation than the (1, 7) code as it is a block code with a simple decoder implementation. As the symbol spacing s in our case remains D/2, the density gain of this scheme amounts to 2*6/7=1.7143. Compared to the d=1 code used currently, the embodiment offers a potential 28.6% increased recording density, while at the same time providing direct-overwrite functionality.

The fact that embodiments of the invention support codes of higher rate also has favorable implications for the achievable user data rate. Specifically, a rate 6/7 code translates to a user data rate that is 28.6% higher than the corresponding data rate in a (1, 7) code for a fixed channel data rate. The channel data rate depends on the complexity of the analog front-end circuitry and of the read channel, and may be limited by the IC technology used.

Experimental Results

The exemplary recording scheme described above with reference to FIGS. 3 and 4 has been tested experimentally and compared to the known d=1 recording scheme. All experiments were performed with the same single probe/tip in a single cantilever test stand. As there is no coding on the user data in the embodiment tested, while d=1 coding is applied in the known scheme, the effective linear recording densities are different. For the same symbol pitch s, the present embodiment achieves 50% higher density than the d=1 system. In order to compare the two schemes on the same basis, several recording experiments were performed at different densities. For each recording method and data density, a data set of at least 10,000 symbols, 20 tracks of 500 symbols each, was recorded and read back. The symbol pitch was 30.8, 20.5 and 15.4 nm for the embodiment of the invention, and 20.5, 15.4, 12.8 and 10.3 nm for the d=1 method. These numbers correspond to linear densities ranging between 825 and 1650 Kbit/in. As the track pitch was fixed at 41.0 nm, the corresponding areal densities ranged between 511 and 1022 Gbit/in$^2$. In all cases the write voltage was set to 5.2 V and the electrostatic voltage to 9.0 V, and they were both applied in pulses of 6.0 µs duration with a period of 128 µs and 64 µs for D/2- and D/4-spaced pulses respectively. For averaging of the readback signals in order to reduce electronics and media noise effects, the data pattern used for the writing comprised a sequence which was repeated in each track.

Figure 6:
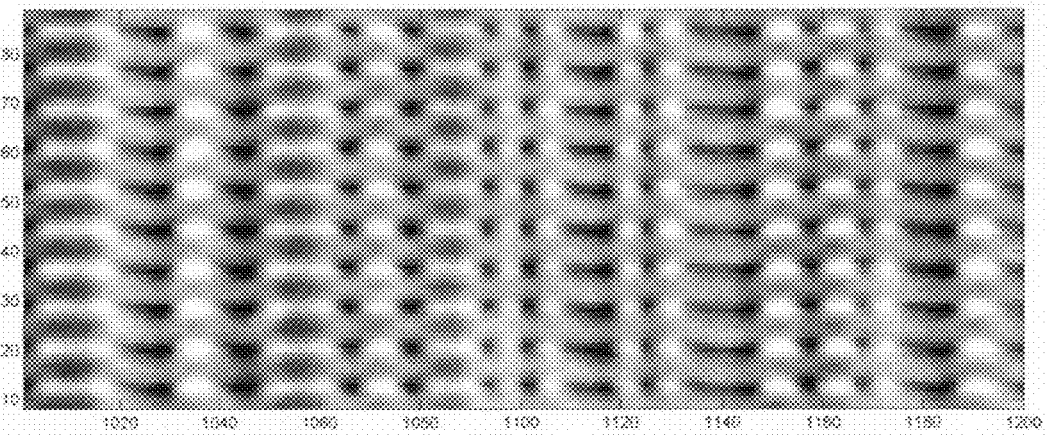
FIG. 6 shows an image of recorded tracks obtained with an embodiment of the invention.
Figure 7:
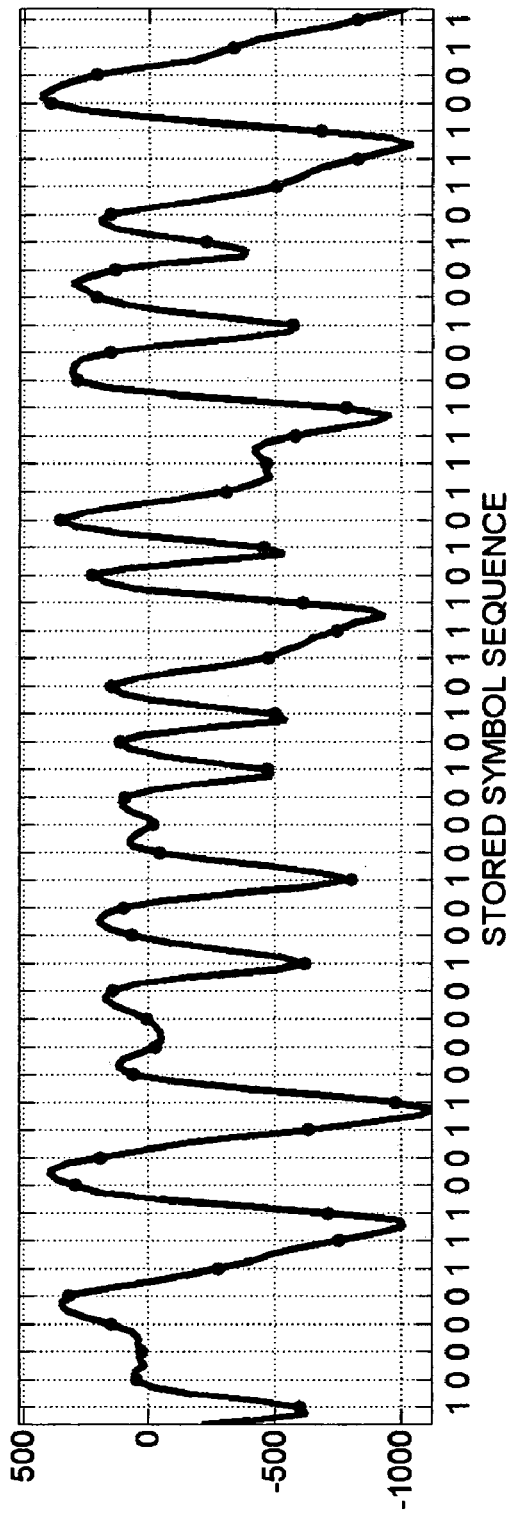
FIG. 7 illustrates a line scan across a recorded track in FIG. 6.
Figure 8:
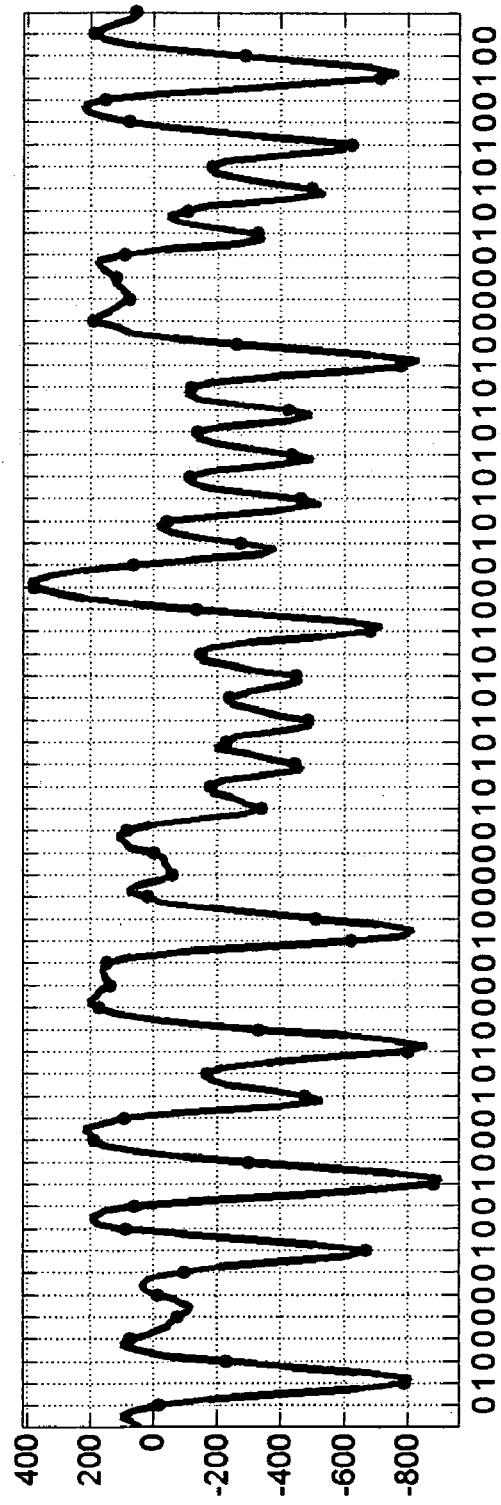
FIG. 8 illustrates a line scan across a recorded track obtained with a previously-proposed system.
Figure 9:
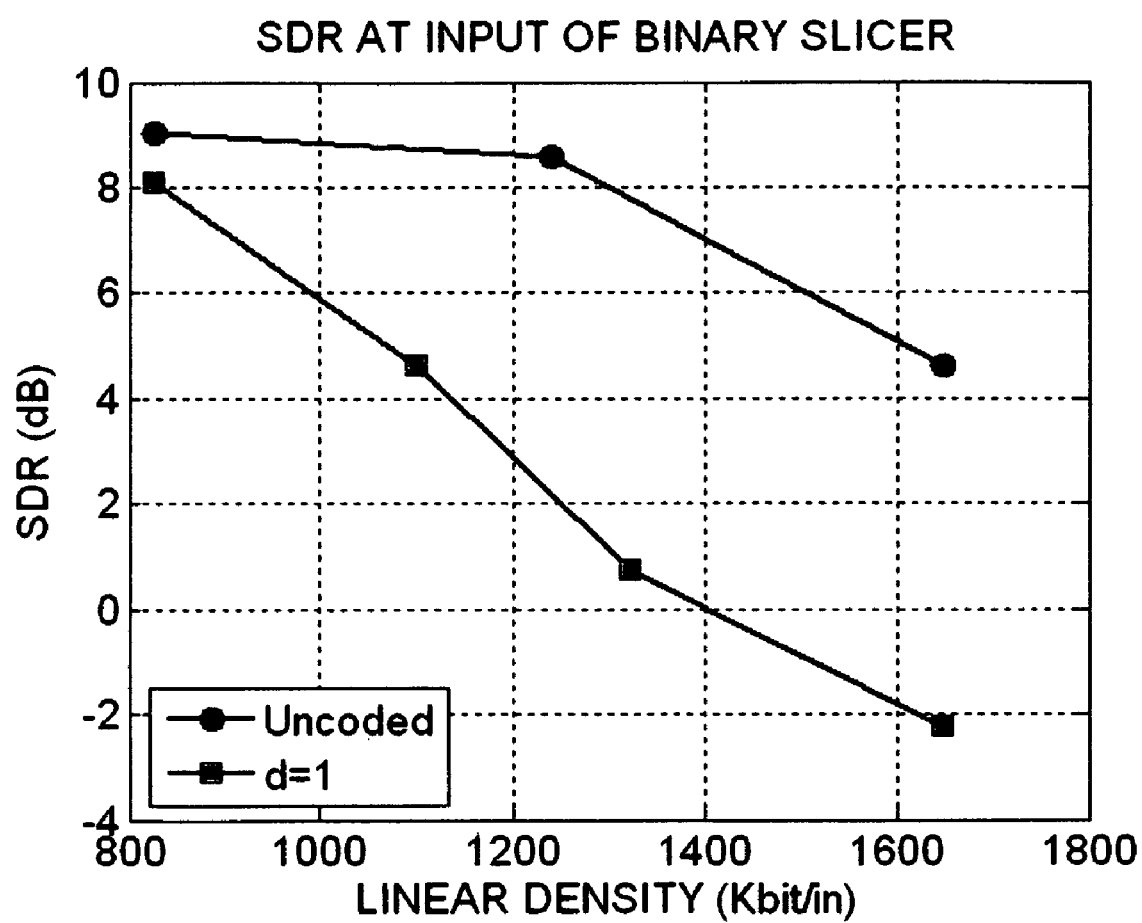
FIG. 9 is a graph comparing performance of embodiments of the invention with a previously-proposed system.

FIG. 6 shows an image of a part of ten consecutive tracks recorded with the method embodying the invention, at a symbol pitch of 20.5 nm, linear density 1239 Kbit/in. Isolated indentations as well as longer grooves of varying lengths are clearly visible in the image. Furthermore, FIG. 7 shows a line scan across the track in the middle of the FIG. 6. The quality of the written grooves can be better appreciated in this figure. Along with the analog readback signal shown by the solid line, FIG. 7 shows by dots and crosses the readback signal samples corresponding to "0's" and "1's" respectively in the stored data pattern. As can be seen, the amplitudes of "0's" and "1's" are well separated, indicating that simple threshold detection can reproduce the underlying stored pattern. For comparison, FIG. 8 shows part of a data track recorded with the known d=1 method. The symbol pitch was 15.4 nm, giving an effective linear density of 1100 Kbit/in. Although the density is lower than in FIG. 7, it can be seen that the amplitude levels of "0's" and "1's" are not as well separated as in FIG. 7. Partial erasing between indentations spaced at the minimum pitch of 2*15.4=30.8 nm is clearly visible, causing the deterioration of the amplitude margin at the binary threshold detector input. The performance of the binary threshold detector can be assessed in terms of the signal-to-distortion ratio (SDR) at the detector input. The difference between the average amplitude levels of "0's" and "1's" is treated here as the signal, while any deviation around these averages is considered distortion. The SDR across different recording linear densities for both the known d=1 method as well as methods embodying the invention was measured. The results are shown in FIG. 9. They demonstrate that methods embodying the invention, perform similarly to the known method at 50% higher densities.

While a particular probe storage array is employed in the particular storage device 1 described above, different probe mechanisms may of course be employed in other probe-based storage devices embodying the invention. Many other changes and modifications can be made to the embodiments described without departing from the scope of the invention.

The invention claimed is:

1. A method for recording/reproduction of data in a probe-based data storage device in which application of a write signal causes formation of an indentation in a storage surface by a probe of the device, the method comprising:

recording a sequence of n>1 successive bits of a first value in a recording signal by applying a series of write signals at respective probe-positions on the storage surface spaced at $w \leq M$, where M is an indentation merging distance, to form a groove in the storage surface spanning n readback sample positions; and sampling a readback signal corresponding to the recording signal at timings corresponding to the readback sample positions, wherein the readback sample position spacing $s<D$, where D is an indentation interference threshold.

2. A method as claimed in claim 1 including recording an isolated bit of said first value in the recording signal by applying a single write pulse at a corresponding readback sample position on the storage surface.

3. A method as claimed in claim 1 wherein $D/2 \leq s < D$.

4. A method as claimed in claim 1 wherein $w=M$.

5. A method as claimed in claim 1 wherein $w=D/4$ and $s=D/2$.

6. A method as claimed in claim 1 further comprising producing the recording signal by coding an input signal to constrain the maximum number of successive bits not of said first value in the recording signal such that the length of any land between adjacent indentations in the storage surface is $\leq D$.

7. A method as claimed in claim 6 further including coding the input signal to constrain the maximum number of successive bits not of said first value in the recording signal to two.

8. A method as claimed in claim 1 including producing the recording signal by coding an input signal to constrain the maximum number of successive bits of said first value in the recording signal to a predetermined number.

9. A method as claimed in claim 1 wherein bits of said first value are bits of value "1".

10. A computer program embodied in a non-transitory computer-readable medium storing instructions for controlling operation of a probe-based data storage device in which application of a write signal causes formation of an indentation in a storage surface by a probe of the device, the program being adapted for controlling the device to perform a data recording/reproduction method comprising the steps of:

recording a sequence of $n>1$ successive bits of a first value in a recording signal by applying a series of write signals at respective probe-positions on the storage surface spaced at $w \leq M$, where M is an indentation merging distance, to form a groove in the storage surface spanning n readback sample positions; and sampling a readback signal corresponding to the recording signal at timings corresponding to the readback sample positions, wherein the readback sample position spacing $s<D$, where D is an indentation interference threshold.

11. Apparatus for controlling recording/reproduction of data in a probe-based data storage device in which application of a write signal causes formation of an indentation in a storage surface by a probe of the device, the apparatus comprising:

at least one recording component to effect recording of a sequence of $n>1$ successive bits of a first value in a recording signal by application of a series of write signals at respective probe-positions on the storage surface spaced at $w \leq M$, where M is an indentation merging distance, to form a groove in the storage surface spanning n readback sample positions; and at least one control sampling component for control sampling of a readback signal corresponding to the recording signal at timings corresponding to the readback sample positions, wherein the readback sample position spacing $s<D$, where D is an indentation interference threshold.

12. Apparatus as claimed in claim 11, the apparatus being further adapted to effect recording of an isolated bit of said first value in the recording signal by application of a single write pulse at a corresponding readback sample position on the storage surface.

13. Apparatus as claimed in claim 11 wherein $D/2 \leq s < D$.

14. Apparatus as claimed in claim 11 wherein $w=M$.

15. Apparatus as claimed in claim 11 wherein $w=D/4$ and $s=D/2$.

16. Apparatus as claimed in claim 11, the apparatus being further adapted to produce the recording signal by coding an input signal to constrain the maximum number of successive bits not of said first value in the recording signal such that the length of any land between adjacent indentations in the storage surface is $\leq D$.

17. Apparatus as claimed in claim 16, wherein said coding of the input signal constrains the maximum number of successive bits not of said first value in the recording signal to two.

18. Apparatus as claimed in claim 11, the apparatus being further adapted to produce the recording signal by coding an input signal to constrain the maximum number of successive bits of said first value in the recording signal to a predetermined number.

19. Apparatus as claimed in claim 11 wherein bits of said first value are bits of value "1".

20. A probe-based data storage device comprising:

a storage surface;

a read/write mechanism comprising at least one probe movable relative to the storage surface for writing to, and reading from, the surface, wherein application of a write signal causes formation of an indentation in the storage surface by the probe;

a controller for controlling the read/write mechanism to effect recording of a sequence of $n>1$ successive bits of a first value in a recording signal by application of a series of write signals at respective probe-positions on the storage surface spaced at $w \leq M$, where M is an indentation merging distance, to form a groove in the storage surface spanning n readback sample positions; and a sampler for sampling a readback signal corresponding to the recording signal at timings corresponding to the readback sample positions, wherein the readback sample position spacing $s<D$, where D is an indentation interference threshold.

* * * * *